Feb. 27, 1962   K. B. SORENSEN ETAL   3,022,754
AUXILIARY SPROCKET CARRYING MEANS FOR A PLANTER
Filed July 19, 1956   7 Sheets-Sheet 1

FIG. 1

INVENTORS.
KNUD B. SORENSEN
ARTHUR J. BJERKAN
BY
ATTORNEYS

Feb. 27, 1962 K. B. SORENSEN ETAL 3,022,754
AUXILIARY SPROCKET CARRYING MEANS FOR A PLANTER
Filed July 19, 1956 7 Sheets-Sheet 4

INVENTORS.
KNUD B. SORENSEN
ARTHUR J. BJERKAN

ATTORNEYS

Feb. 27, 1962 K. B. SORENSEN ETAL 3,022,754
AUXILIARY SPROCKET CARRYING MEANS FOR A PLANTER
Filed July 19, 1956 7 Sheets-Sheet 6

INVENTORS.
KNUD B. SORENSEN
ARTHUR J. BJERKAN
BY
ATTORNEYS

FIG. 23

United States Patent Office 3,022,754
Patented Feb. 27, 1962

3,022,754
AUXILIARY SPROCKET CARRYING MEANS
FOR A PLANTER
Knud B. Sorensen, Rock Island, and Arthur J. Bjerkan, Moline, Ill., assignors, by mesne assignments, to Deere & Company, a corporation of Delaware
Filed July 19, 1956, Ser. No. 598,854
1 Claim. (Cl. 111—52)

The present invention relates generally to agricultural implements and more particularly to planting means of the unit type, of which a plurality of such units are usually attached to a transversely disposed toolbar or other support mounted on a tractor or the like.

The object and general nature of the present invention is a provision of a unit planter in which a press wheel is adjustably connected with the main body of the planting unit and is connected by suitable drive means so that the press wheel serves not only as a press wheel, mounted rearwardly of the seed dispensing means, but also as a depth determining means, and it is a further object of this invention to provide means whereby the press wheel drives the seed dispensing means through drive mechanism that is included in a housing that serves as an adjustable arm pivotally or movably connecting the press wheel with the seed boot and associated parts.

Another feature of this invention is a provision of new and improved drive means whereby, with a minimum of auxiliary parts and a minimum of handling, a substantial number of different drive ratios between the press wheel and the seed dispensing means is available. A further feature of this invention is the provision of means whereby changes in the drive ratio are accomplished through auxiliary sprockets, one or more of which are maintained readily available for use within the press wheel drive housing.

Still further, an additional feature of this invention is the provision of new and improved mounting means by which a seed boot and associated parts are connected with the toolbar or other support through mechanism that provides for an adjustable amount of down pressure, whereby to insure the desired penetration of the furrow opening means, and it is also a feature of this invention to provide new and improved spring means whereby the effective amount of down pressure may readily be adjusted by an operator without the use of any tools, levers or the like.

Another feature of this invention is the provision of adjusting means associated with the press wheel drive housing, whereby the position of the press wheel relative to the furrow opener boot may readily be made and the depth of operation secured thereby clearly indicated.

An additional feature of this invention is the provision of an implement support in the form of a rockable bar in combination with an implement, such as a plurality of planting units, each having a furrow opener and a rigidly connected gauge wheel spaced from the furrow opener, each unit being connected through parallel links, whereby rocking of the toolbar serves to adjust the relationship between the gauge wheel and the associated furrow opener in all of the units.

These and other objects and advantages of the present invention will be apparent to those skilled in the art after a consideration of the following detailed description, taken in conjunction with the accompanying drawings, in which.

Figure 1:
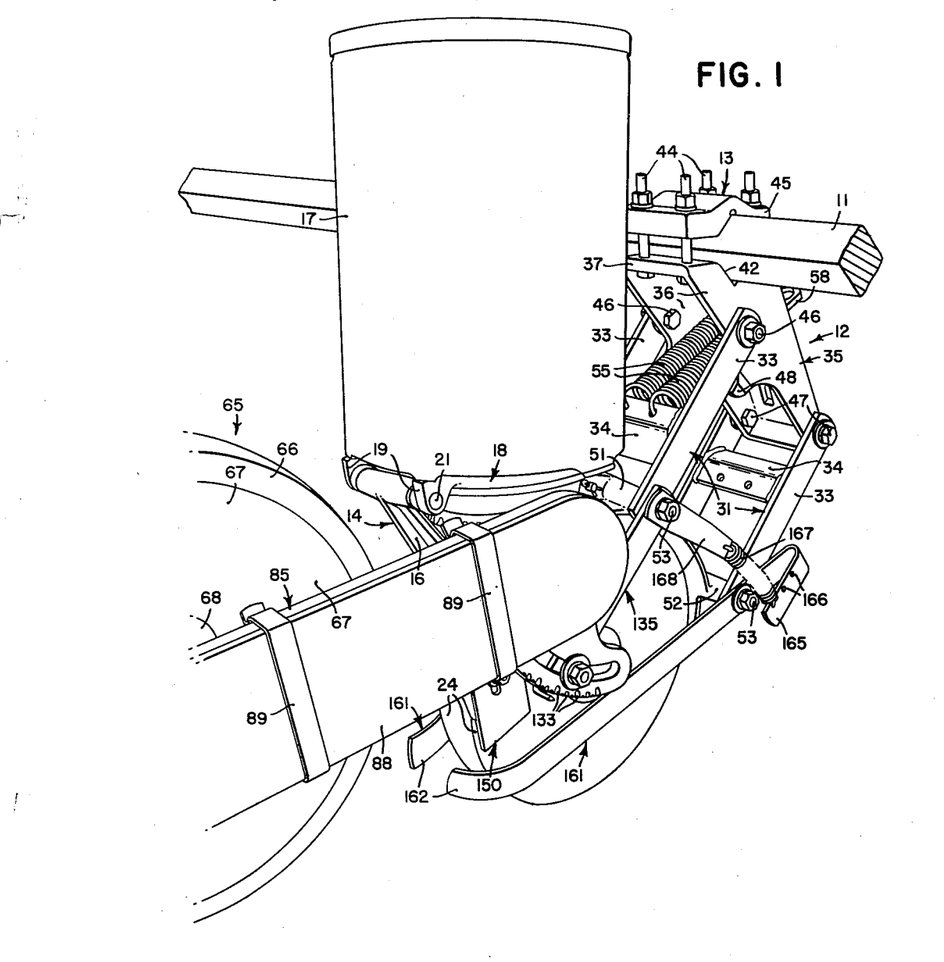
FIG. 1 is a perspective view of a toolbar mounted unit planter incorporating the principles of the present invention.
Figures 3, 4, 5:
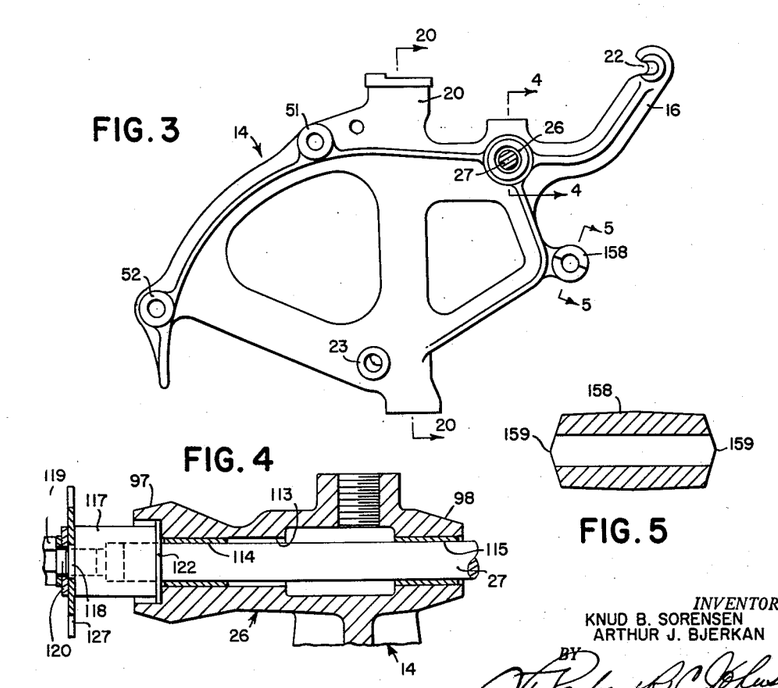
FIG. 3 is a side view of a portion of the hopper-supporting frame casting.
FIG. 4 is an enlarged section taken along the line 4—4 of FIG. 3.
FIG. 5 is an enlarged section taken along the line 5—5 of FIG. 3.

Referring first to FIG. 1, the planting unit is shown as detachably mounted on a toolbar 11 that is square in cross section and is conventionally carried at the rear of the tractor for receiving a plurality of planting units. Preferably, the toolbar 11 is arranged on the tractor with the bar rotated to a diagonal disposition, one edge of the bar being disposed in an uppermost position and the opposite edge in a lowermost position. The planting unit includes a mounting bracket 12 secured to the toolbar or support 11 by clamp means 13, and the planting means includes a furrow opener boot 14, preferably in the form of a casting having a rear extension 16 adapted to hingedly receive a hopper 17 in which conventional seed selecting means is disposed. Preferably, the hopper 17 includes a hopper bottom 18 having lugs 19 that are apertured to receive a hinge pin 21 that, when the hopper 17 is mounted in position on the furrow opener boot, is disposed in a notched opening 22 (FIG. 3) formed in the rear portion of the furrow opener boot extension 16. The latter also includes a lower bearing section 23 on which a pair of disk furrow openers 24 are mounted for rotation, as by conventional bearing means 25. A seed passageway 20 at the upper portion of the furrow opener boot 14 receives seed from the dispensing means of the hopper 17 and conducts the seed downwardly into the furrow opened by the disks 24. The furrow opener boot 14 also includes a transverse tubular section 26 in which a cross shaft 27 is disposed for rotation. At one end, the shaft 27 carries a pinion 28 that meshes with and drives a seeding gear 29 that, in turn, drives the seed dispensing means in the hopper 17. The means for driving the shaft 27 will be described below.

Figures 12, 13:
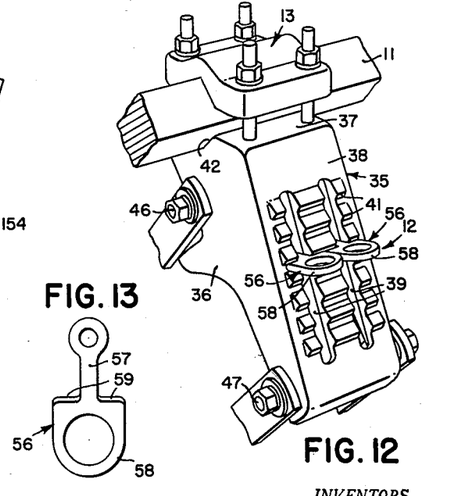
FIG. 12 is a fragmentary perspective view showing the toolbar supported bracket by which the planting unit is connected to the supporting toolbar.
FIG. 13 is a detail view of one of the spring adjusting parts.
Figure 17:
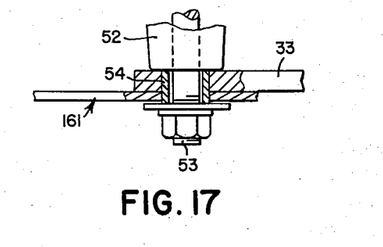
FIG. 17 is a fragmentary detail view, partly in section, of the pivotal support for one of the furrow-filling covering arms.

The furrow opener boot 14 and associated parts, including the hopper 17, are mounted for relatively free floating movement with respect to the support or toolbar 11 and to this end a pair of parallel link units 31 are provided for swingably connecting the furrow opener boot 14 with the mounting bracket 12. Each of the link units 31 comprises a pair of spaced apart bars 33 held in spaced apart relation by a strut 34 securely fixed, as by welding, at its end to the associated links 33. The mounting bracket 12, FIG. 12, comprises, in general, a channel-like part 35 having sides 36, an upper wall portion 37 and a forward wall portion 38, the latter being provided with a pair of vertical slots 39 and transverse ribs 41 for a purpose that will be referred to later. The upper face 37 is provided with V-shaped notches 42 that, as best shown in FIG. 1, are adapted to engage the lower surfaces of the toolbar 11, and the upper face 37 of the mounting bracket is also provided with a plurality of bolt-receiving openings in which a plurality of fasteners 44, extending upwardly through a clamping cap 45, are received. When the fasteners 44 are tightened, the mounting bracket 12 is securely fixed to the toolbar or support 11. The side portions 36 of the mounting bracket 12 are apertured to receive pivot means 46 and 47 by which the forward portions of the link units 31 are connected with the bracket 12 for generally vertical swinging movement. The side portions 36 are provided with outwardly and rearwardly disposed extensions or lugs 48 that are located so as to engage the forward portions of the links 33 of the upper link unit 31, serving thereby as stops for limiting the downward swinging of the upper link unit 31 and hence limiting the downward movement of the furrow opener boot 14 and associated parts. To provide means to receive the rear portions of the parallel link units 31, the furrow opener boot 14 is provided with upper and lower transverse tubular extensions 51 and 52 by which pivot bolt means 53, extending through the rear apertured ends of the upper and lower links 33 and through associated bushings 54 (FIG. 17), swingably mount the furrow opener boot 14 and associated parts on the rear or lower ends of the parallel link units 31.

Spring means are provided for applying an adjustable amount of down pressure so as to force the furrow opening disks 24 into the ground, and provision is made whereby the amount of down pressure exerted may be adjusted by the operator without the use of any tools, levers or the like, although in some cases a relatively large amount of down pressure may be required. For this purpose, a pair of springs 55 are connected between the upper link unit 31 and the mounting bracket 12. Each of these springs is indicated by the reference numeral 55, and the rear ends of the springs 55, as can best be seen in FIG. 1, are hooked into openings formed in the upper strut 34. The forward end of each spring 55 receives the rear portion of a spring anchoring member 56, and each of these members includes a narrow eyed portion 57 (FIG. 13) that extends through the associated slot 39, being formed at its forward end with manually engageable means in the form of a finger hole portion 58 and associated shouldered portions 59. The shouldered portions 59 are adapted to lie in the notches between selected ribs 41, the mounting bracket 12 being so shaped that a greater spring pressure is exerted when the eye members 56 engage in the lower ribbed portions of the bracket. The tension of the springs 55 may be individually adjusted, and two springs are provided, rather than a single spring, so that an operator may more readily adjust the springs to different positions, as desired, even to the positions where relatively substantial forces are exerted, because the springs may be adjusted one at a time, and therefore less force need be exerted by the operator than would be the case if he were required to adjust a single relatively strong spring. Also, by having two springs, a relatively finer adjustment may be secured since one spring may be adjusted along the forward face of the mounting bracket to a position slightly different from that to which the other spring is brought.

Figure 8:
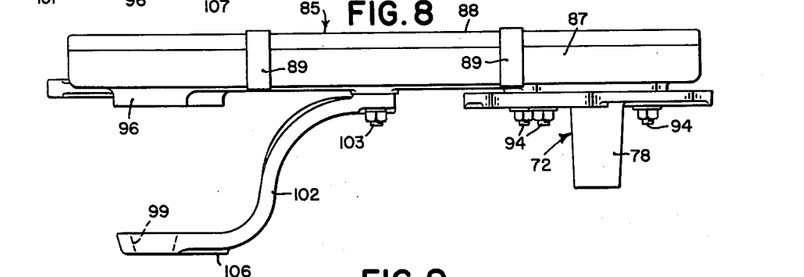
FIG. 8 is an edge view of the press wheel arm casting shown in FIG. 6, with additional parts added.
Figure 9:
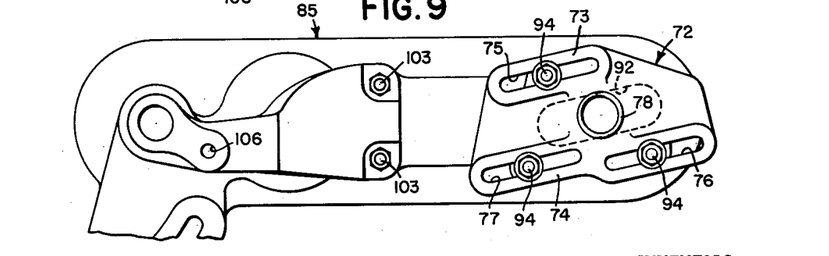
FIG. 9 is a side view of the press wheel arm casting, showing the same side as the side shown in FIG. 6, but with additional parts added.
Figure 10:
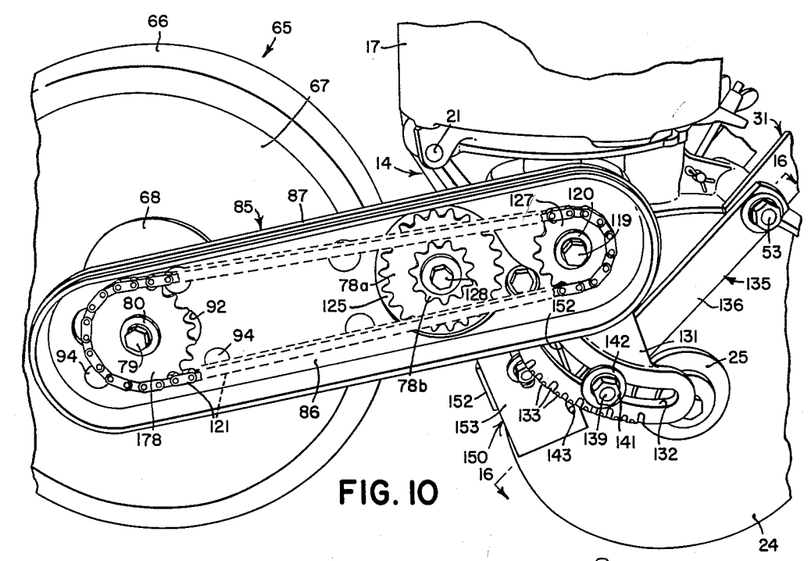
FIG. 10 is a fragmentary perspective view showing the drive between the seeding shaft of the seed hopper and the press wheel shaft.

According to the principles of the present invention, the press wheel, which is indicated in its entirety by the reference numeral 65, is employed, not only to firm the soil about the planted seed, but also to determine or control the depth of operation and, additionally, to drive the seed dispensing means that forms a part of the planting unit. The press wheel 65 includes a rubber or flexible tread section 66, a web section 67, and a hub section 68 that is secured in any suitable way, as by a press fit, to one end of a press wheel shaft 69 (FIG. 14) that is journaled for rotation, as by bearing means 71, in a press wheel bracket 72. The latter comprises a plate-like structure having upper and lower slotted portions 73 and 74 (FIGS. 8 and 9) formed with slots 75, 76 and 77, and a generally centrally disposed tubular sleeve section 78 that receives the outer race of the bearing means 71, the outer race being secured in the tubular bracket section 78 by a set screw 79 that extends into a groove 79a formed in the outer bearing race. The bearing means and other parts are so constructed and arranged that the shaft 69 is held in the bracket 72 against lateral displacement. The end of the shaft 69 opposite the press wheel hub 68 carries, as by a press fit, a drive sprocket hub 176 that is of special construction, having at its outer end a generally oblong non-circular lug 177 that is adapted to receive an associated sprocket 178 that is substantially flat, as shown in FIG. 10, having a central aperture that fits non-rotatably over the lug 177. The lug portion 177 of the sprocket hub 176 is tapped and threaded to receive a cap screw 79 that with associated washer 80 serves to hold the sprocket 178 onto the shaft 69, but by removing the cap screw 79 and associated washer 80, the sprocket 178 may be removed and replaced by other sprockets, such as one of the sprockets shown at 78a and 78b (FIG. 10), for example, reference to which will be made in more detail below.

Figure 6:
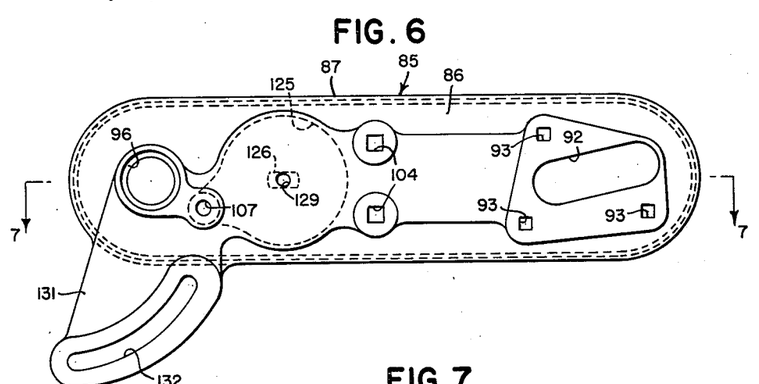
FIG. 6 is a side view of the press wheel arm casting.
Figure 14:
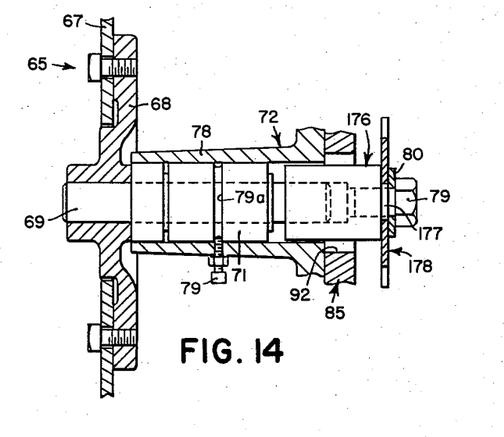
FIG. 14 is a sectional view taken through the press wheel, corresponding generally to a section taken along the line 14—14 of FIG. 2.
Figure 15:
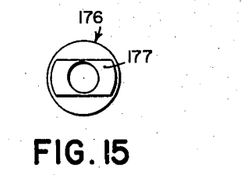
FIG. 15 is an end view of one of the sprocket-mounting parts.

The press wheel 65 is adjustably connected with the furrow opener boot 14 by adjustable support or arm member 85 that, according to the present invention, is shiftable in concentric relation with respect to the seeding mechanism drive shaft 27. The support 85 preferably takes the form of a rigid generally longitudinally extending chain drive housing having a back wall 86 and a continuous flange 87 forming side walls to which a housing cover 88 is adapted to be fixed, as by spring fasteners 89. The rear or outer end of the chain drive housing 85 is formed with a generally fore-and-aft extending slot 92 through which the press wheel shaft 69 and associated sprocket hub 176 are adapted to extend (FIG. 14). This portion of the chain drive housing is also provided with three openings 93 (FIG. 6) to non-rotatably receive the head portions of connecting bolts 94 (FIG. 9) that extend through the openings 93 and the associated slots 75, 76 and 77 in the press wheel bracket 72. The slots 75—77 and 92 are of substantial length so that when the bolts 94 are loosened, the press wheel and its bracket may be adjusted generally longitudinally of the drive housing or press wheel arm 85. The purpose of this arrangement will be referred to below.

Figure 2:
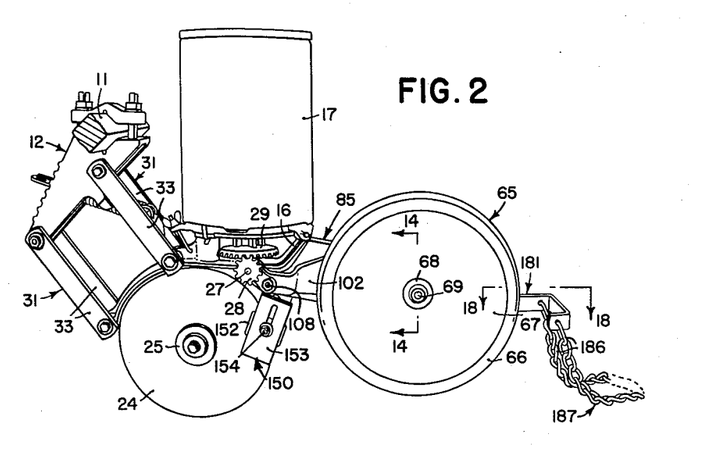
FIG. 2 is a side view of the planter shown in FIG. 1, showing the side of the planter opposite that shown in FIG. 1.
Figure 7:
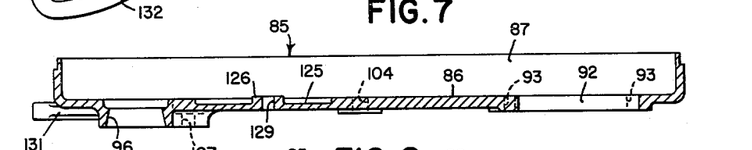
FIG. 7 is a sectional view taken along the line 7—7 of FIG. 6.

The forward portion of the chain drive housing or press wheel supporting arm 85 is provided with a conically apertured section 96 (FIG. 7) formed in the back wall 86 of the housing, and this portion of the drive housing is rockably mounted on a complementarily tapered end portion 97 (FIG. 4) of the tubular boss or sleeve section 26 formed on the furrow opener boot casting 14. The opposite end of the transverse boot section 26 is also tapered, as indicated at 98, and this portion is received in a conical opening 99 (FIG. 8) formed on the forward end of a housing brace 102, the opposite end of which is extended vertically and apertured to receive a pair of clamping bolts 103 that extend through openings 104 formed in the back wall of the drive housing 85 and fix the brace 102 to the housing 85 in such position that the conical opening 99 of the brace is in coaxial or aligned relation with respect to the tapered or conical opening 96 in the forward end of the drive housing. A portion of the drive housing brace 102 and the back wall of the housing 85 are apertured, as at 106 and 107 respectively, to receive a tightening bolt 108 (FIG. 2) which, when tightened, brings and holds the associated tapered surfaces into close fitting relation whereby the press wheel 65 is rigidly connected with the associated furrow opening boot 15, although the arm or drive housing 85 may be swung in a generally vertical direction to adjust the position of the press wheel relative to the associated furrow opening boot. The seeding drive shaft 27 is disposed for rotation in the tubular section 26 of the boot member 14 (FIG. 4), the boot extension 26 having a shaft receiving opening 113 therein and in which cylindrical bearing members 114 and 115 are disposed. At one end, the shaft 27 receives the pinion 28 that drives the seeding gear 29 mentioned above. At the other end, the shaft 27 is threaded and receives a driven sprocket hub 117 that is provided with an oblong extension or lug 118 dimensionally identical with the lug 177 on the drive hub 176 that is fixed to the press wheel shaft 69. Thus, any sprocket that can be attached to the drive hub 176 may also be mounted on the driven sprocket hub 117. The latter is formed with a central opening that permits attachment to the seeding drive shaft 27 and which is tapered to receive a cap screw 119 that, with a washer 120, secures a sprocket 127 to the shaft 27. A drive chain 121 is trained over the sprockets fixed to the press wheel shaft and the seeding shaft and forms means whereby rotation of the press wheel serves to drive the seeding mechanism. A thrust washer 122 is disposed between the inner end of the hub 117 and the adjacent portion of the tubular section 26.

Reference was made above to the feature of the present invention wherein different sprockets may be mounted on the press wheel shaft and seeding shafts to provide different drive ratios. To this end of providing for a considerable number of permissible ratios, the back wall 86 of the drive housing is provided with a shallow recess 125 in the generally central portion of which a stud 126 (FIG. 7) is provided, the stud being oblong and corresponding substantially identically to the shape of the lugs 177 and 118 described above, except that the housing lug 126 is somewhat longer, whereby this lug is adapted to receive two auxiliary sprockets 78a and 78b (FIG. 10) so as to have them available for substitution for either the sprocket 178 on the press wheel shaft or the sprocket 127 on the seeding shaft. A cap screw 128 is screwed into a threaded opening 129 formed in the central portion of the stud 126 for the purpose of holding the auxiliary sprockets 78a and 78b in the housing 85. Where different diameter sprockets are substituted it is necessary to make a corresponding adjustment in the drive chain 121, and to that end all that it is necessary to do is to loosen the bolts 94 and shift the press wheel bracket 72 to a position in which the drive chain 121 has the requisite tightness, and then tightening the bolts 94. Since, as best shown in FIG. 1, the drive housing 85, mounting the press wheel 65 on the furrow opener boot, is for most operating positions disposed at a slight a angle to the horizontal, the slot 92 that is formed in the back wall at the rear portion of the drive housing 85 lies at a slight angle to the longitudinal axis of the member 85, thus disposing the slot in a position generally parallel to the ground surface. This is for the purpose of minimizing any variations in the depth of operation when different sprockets are substituted for effecting a change in the drive ratio.

Figure 16:
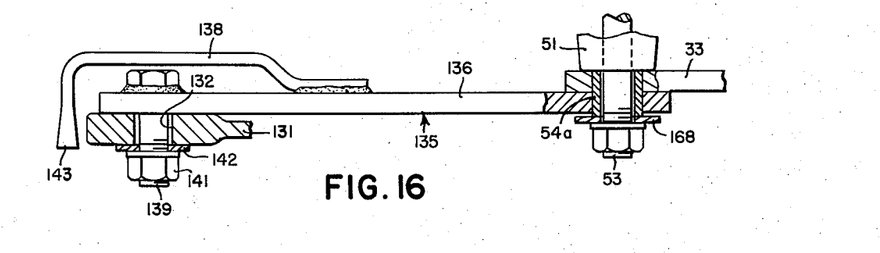
FIG. 16 is a sectional view taken generally along the line 16—16 of FIG. 10.

The depth of operation is determined by the position of the press wheel 65 and the member 85 that connects the press wheel with the furrow opener boot. New and improved means is provided for making the depth adjustment, when necessary, and to this end an adjustable connection between the drive housing 85 and the furrow opener boot is provided. An arcuate extension 131 is formed on or carried by the housing member 85 and is provided with a slot 132 along which is formed, on the outer side thereof, a number of substantially equally spaced depth indicating graduations 133. Cooperating with the arcuate extension 131 is a combined link and pointer indicated generally at 135, this member comprising a link member 136 apertured at one end to fit over the bolt or pivot means 53 that connects the rear portion of the upper parallel link unit with the adjacent portion of the furrow opener boot 14. The other end of the link 136 carries a pointer element 138 (FIG. 16) that is fixed to the inner side of the link 136, extending over the head of a cap screw 139 that at its threaded end extends through the slot 132, receiving a nut 141 and washer 142 disposed at the outer side of the slotted extension 131 on the drive housing 85. The stud 139 is shifted into different positions in slot 132, and when so shifted, the arm member 85 is disposed in different angular positions about its axis of pivotal or swinging connection with the boot castings 14. The length of the link 136 and the disposition and configuration of the slot 132 are such that for uniform increments of change in the depth of operation, the pointer element 138 (FIG. 16), particularly the outer flattened end 143 thereof, shifts generally uniformly along the graduated portion 133 of the arcuate sector 131. Preferably, the parts are so arranged that the movement of the pointer for a given change in the depth of operation is dimensionally the same as the actual change in planting depth. Tightening the nut 141 secures the housing 85 in the desired position and thus provides uniform planting at the desired depth. The arm 136 swings on the associated bushing 54a.

During the aforesaid adjustments the arm 85 swings about an axis that coincides with the axis of the shaft 27, and hence, when such adjustments are made the sprocket and chain drive connections are not affected in any way.

Figure 11:
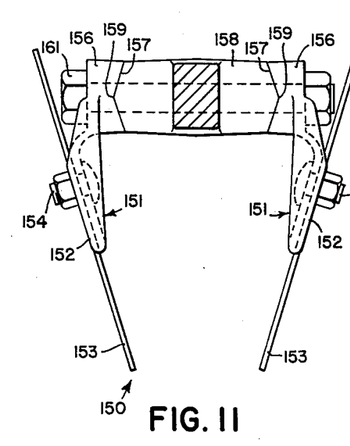
FIG. 11 is a fragmentary view, parts being shown in section, showing the scraper mechanism.

Cooperating with the furrow opening disks 24 is a scraper means indicated in its entirety by the reference numeral 150 in FIG. 1. Such means includes a pair of scraper supports 151 (FIG. 11) each comprising a flat plate-like part having a pair of spaced apart ridges 152 between which a scraper blade 153 is disposed. The blade is a simple flat plate having an opening to receive an attaching bolt 154 that extends through an opening in the associated scraper support 151. Each scraper support includes an attaching lug section 156 having a V-shaped surface 157 facing laterally inwardly. To receive the two scraper supports 151, the furrow opener boot, adjacent the rear portion thereof, carries a transversely disposed sleeve-like lug 158, the ends of which are V-shaped, as indicated at 159, whereby when the scraper supports 151 are mounted in place with faces 157 engaging the V-shaped faces 159 on the boot lug 158, and the attaching bolt 161 that extends through the associated parts tightened, the scraper supports are firmly and rigidly connected to the boot 14. The scraper blades 153 are slotted where the bolts 154 pass therethrough, and by adjusting the blades toward or away from the disks, the proper operating relationship therebetween may be secured.

A pair of covering arms 161 are provided at each side of the associated furrow opening disks 24. Each covering arm 161 includes a rear laterally inwardly directed curved section 162 that scrapes adjacent soil into the furrow opened by the disks 24 so as to partially cover the seed deposited therein. Each covering arm is pivotally mounted on the boot member 14 preferably at the same point as the lower parallel link unit 31. Preferably, the covering arms 161 are mounted on bushings 54 (FIG. 17) that are fixed to the boot member 14 when the lower attaching bolt 53 is tightened. The forward end of each of the covering arms 161 is bent outwardly and rearwardly, as indicated at 165 in FIG. 1, and is provided with a plurality of openings 166 to receive the lower end of an associated tension spring 167, the holes 166 being at different distances from the pivot axis defined by the bolt 53. At its upper end, each of the tension springs 167 is connected to an anchoring link 168 that is rigidly fixed to the boot castings 14 by the upper connecting bolt 53.

In operation, each tension spring 167 applies upward pressure to the front end of the associated cover arm 161 and thereby causes the rear ends of the cover arms 161 to press downwardly in a yielding fashion against the soil. When the toolbar 11 is raised for transport, the entire unit is raised upwardly, but the downward movement of the planting unit is limited by contact of the upper parallel link unit 31 with the stops 48. To limit undesired downward movement of the rear ends of the cover arms 161 when the planting unit is raised off the ground, the tension springs 167 are so arranged that after a small amount of downward swinging of the arms 161, the springs 167 become fully compressed and then serve as stops acting between the anchors 168 and the forward end of the cover arms 161, thus preventing any further downward movement of the rear ends of the latter.

Figure 18:
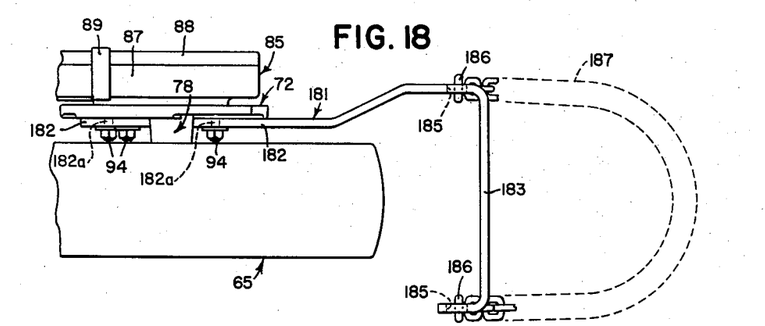
FIG. 18 is a view, corresponding generally along the line 18—18 of FIG. 2, showing the details of the covering chain and support therefor.

Under certain soil conditions, and where otherwise desired, it may be necessary or advisable to provide a covering chain for dragging loose soil over the packed-down area behind the press wheel 65. To this end, we provide a covering chain bracket 181 that comprises a generally L-shaped part having an inturned end section 182, the latter being provided with a pair of apertures 182a that are spaced apart a distance corresponding to the distance between the apertures 93 in the press wheel support arm 85. The bolts 94 are adapted to extend through the openings in the forward portion of the covering chain bracket 181 for fixing the latter to the arm or chain drive housing 85 so that the rear portion of the bracket 181 extends rearwardly in a position to dispose its rear or transverse section 183 substantially directly behind the associated press wheel 65. The rear or transverse section is apertured, as at 185, to receive the hook or attaching members 186 that are secured to and form the end portions of a covering chain 187. The latter is of such length that in operation the covering chain trails along the ground rearwardly of the associated press wheel and brings loose soil over the press wheel track.

Figure 19:
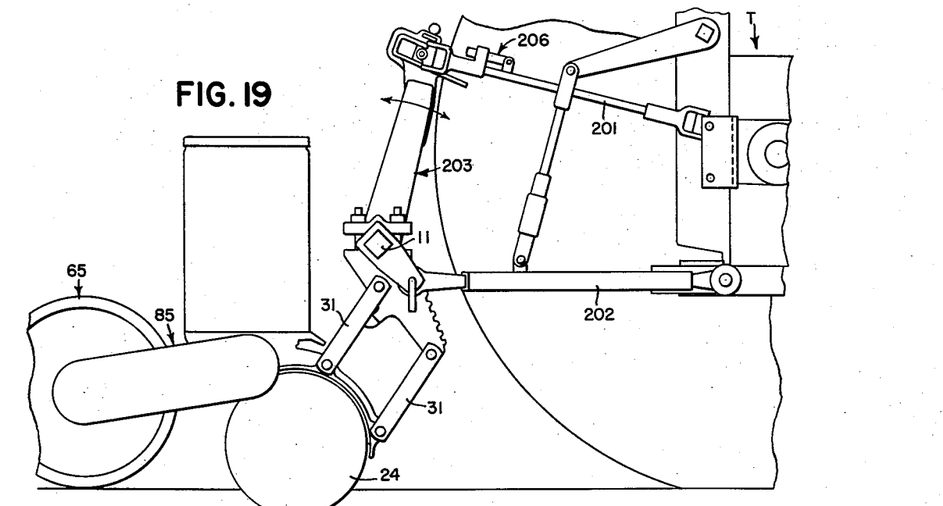
FIG. 19 is a side view illustrating means for rocking the supporting toolbar so as to adjust all of the planting units simultaneously.

FIG. 19 illustrates the manner in which all of the planter units may be adjusted for depth of operation at the same time, it being understood that while in the drawings only one planter unit has been shown, the toolbar 11 normally supports from 4 to 6 or more planting units. While the depth of operation of each unit may be adjusted, as described above, by loosening the bolts 139 and swinging the gauge wheel supporting arm 85 relative to the planting unit, it is sometimes desirable, especially where a considerable number of planting units are carried on the toolbar 11, to provide for adjusting all of them at one time, thereby making it unnecessary to individually adjust each unit. To this end, the toolbar 11 is connected with the associated tractor T by means that includes upper and lower link means indicated at 201 and 202, respectively, the rear ends of the links 201 and 202 being pivotally connected with a vertical mast structure 203, to the lower end of which the toolbar 11 is fixed by any suitable means, as by being welded thereto. The upper link means 201 includes turnbuckle adjusting means 206 such that when the means 206 is actuated to vary the effective length of the upper link means 201, the mast section 203, and the associated toolbar 11, is rocked about a generally fore-and-aft extending axis. Generally speaking, this type of adjustment is usually inadequate to provide the required range of depth adjustment, but according to the present invention where the seed furrow opening means 24, preferably disks, is carried by the planting unit with which the drive housing member 85 is normally rigid, the gauge wheel 65 being journaled on the rear section of the member 85, it will readily be seen from FIG. 19, that when, for example, the toolbar 11 is rocked in a clockwise direcion this serves to tilt the planting unit as a whole about a generally transverse axis, serving in effect to raise the gauge wheels 65 of the several planting units relative to the associated furrow openers, thereby resulting in planting at an increased depth. Such tilting or rocking of the toolbar 11 does not raise or lower the planting units, because the latter are connected by the parallel links 31 so as to be free for vertical movement relative thereto. Thus, rocking of the toolbar 11 furnishes a very convenient way for varying the depth of operation of all the planting units simultaneously.

Figure 20:
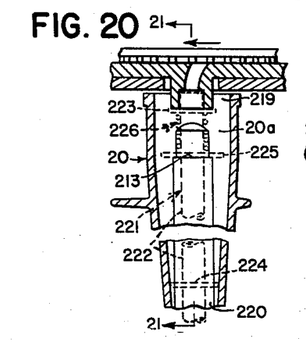
FIG. 20 is a sectional view taken generally along the line 20—20 of FIG. 3 showing, in addition a portion of associated seed dispensing means and an auxiliary seed tube especially adapted to handle small seed.
Figure 21:
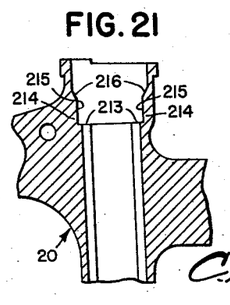
FIG. 21 is a fragmentary sectional view taken generally along the line 21—21 of FIG. 20.
Figure 22:
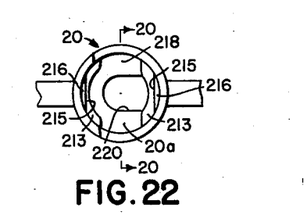
FIG. 22 is a fragmentary plan view of the upper end of the seed passage, with the tube for small seed removed.
Figure 23:
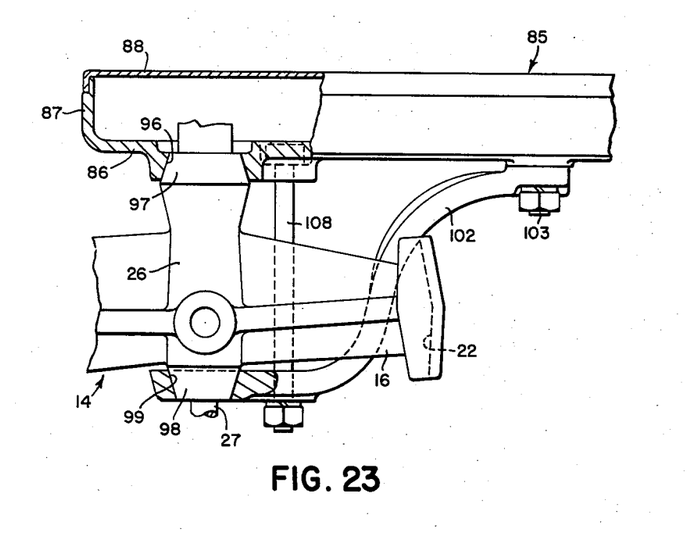
FIG. 23 is a fragmentary view showing the pivotal mounting of the press wheel arm or drive housing on the furrow opener boot.

FIG. 20 shows the details of the seed passageway section 20 of the furrow opener boot 14. This construction is similar to that shown in U.S. Patent 2,650,000, issued August 25, 1953, to Walz et al., but includes some important improvements thereover. As will be seen from FIG. 20, seed selected by the conventional mechanism enclosed in the hopper 17 is delivered to the seed passage 20a extending generally vertically through the seed passageway 20 of the boot casting 14. The passage 20a is substantially smooth from end to end and at its upper end is provided with a pair of shouldered sections 213 disposed generally diametrically opposite one shoulder in a generally fore-and-aft extending plane. Above each of the shouldered sections 213 is a thickened wall portion 214 of substantial vertical dimension and forming a lug having a generally flat laterally inwardly extending face 215 and an angled upwardly facing end wall section 216. Disposing the shouldered section 213 on the front and rear sides of the passageway section 20, provides, in effect a laterally or transversely elongated opening, indicated at 218 (FIG. 22), into which seed from the seed selecting mechanism in the hopper is delivered. Since the associated seeding mechanism, which includes a conventional rotary seed plate, has seed containing cells that are moving generally laterally as they pass over the upper end of the seed boot member 14, the trajectory of the seed dropping from the seeding mechanism into the seed tube section 20 lies a curved path that is disposed in a transverse vertical plane, being the same plane in which the upper opening 218 is elongated. There is, therefore, littel tendency for the seed to engage the upper shouldered portion 213. If perchance any seed engages the inner walls of the seed boot passageway 20a above the shouldered portions 213, they are likely to contact the sloping upper lug walls 216 and thus be deflected downwardly through the opening 218. The upper end of the seed passage is generally circular, as indicated at 219, FIG. 20, while the lower end, shown at 220 in FIGS. 20 and 22, is generally oblong in a fore-and-aft direction.

Where small seed, such as segmented or decorticated beet seed or the like, is to be planted, we preferably provide an arrangement which includes a smooth walled inner tube indicated generally by the reference numeral 221. This seed tube differs, however, in important respects from the seed tube shown in the above mentioned U.S. Patent 2,650,000. The seed tube construction 221 includes a vertical smooth walled tube 222 to the upper end of which a ring 223 is fixed, as by soldering or the like. Adjacent the lower portion of the tube 222 a second ring 224 is secured, preferably in the same way. A loose washer 225 is mounted on the tube between the rings 223 and 224, and between the ring 223 and the washer 225 is a compression spring 226. The diameter of the lower ring 224 is such that when the seed tube 221 is disposed downwardly within the seed passage 20a, the ring 224 cooperates with the inner walls of the seed boot passage to prevent undesired displacement or looseness of the seed tube within the seed boot. It is therefore unnecessary in the present construction to have tube-receiving lugs or the like formed on the inside of the seed boot passage, which lugs it has been found sometimes materially interfered with the uniform movement of the seed, as when planting the larger seeds, such as lima beans and the like, with the small seed tube 221 taken out.

The washer 225 is of such diameter as to fit fairly snugly between the flat faces 215 on the inwardly facing lugs 214. The latter act, when the tube 221 is being inserted into the seed tube passage, to aid in centering the washer 225, which functions about the same and serves substantially the same purpose as the corresponding washer in the above-mentioned patent, thus preventing any tendency for the washer 225 to become tilted and accidentally be passed downwardly into the seed tube passage below the shoulders 213. In other words, the lugs 216 cooperate with the washer 225 to insure seating of the latter against the shouldered sections 213, as shown in FIG. 20.

Disposing the loose washer 225 and spring 226 between the fixed rings 223 and 224 on the tube 222 insures that all of these parts will be held in assembled relation and none will become mislaid or lost.

While we have shown and described above the preferred structure in which the principles of the present invention have been incorporated, it is to be understood that our invention is not to be limited to the particular details, shown and described above, but that, in fact, widely different means may be employed in the practice of the broader aspects of our invention.

What we claim, therefore, and desire to secure by Letters Patent is:

In a planting unit, the combination of a press wheel shaft, a furrow opener boot carrying seed dispensing means and a shaft to be driven for actuating said dispensing means, a drive housing having openings, one adjacent each end, to receive the adjacent ends of said shafts, said shaft ends having non-circular shouldered portions of substantially identical dimensions, each of said shouldered portions being tapped, a substantially flat hub-less sprocket disposable on each of said shouldered shaft ends, each sprocket having a non-circular opening corresponding to the non-circular portion of the associated shaft end, the sprocket openings also being substantially identical dimensionally and at least no smaller than the shouldered portions of the associated shaft ends, whereby said sprockets are interchangeable from one shaft to the other, means threaded into the tapped portions of each of said shafts to releasably hold said sprockets against the associated shouldered portions, said sprockets being of different diameters whereby interchanging said sprockets serves to change the drive ratio between said press wheel shaft and said seed dispensing shaft, a drive chain interconnecting said sprockets, said housing having a stud therein, the end of said stud being non-circular and shouldered, corresponding to the ends of said shafts, said stud extending from the back portion of the housing to a point between the back of the housing and the plane of said drive chain, an auxiliary sprocket mounted on said stud in said housing and adapted to replace either of said first mentioned sprockets so as to provide further changes in said drive ratio, said auxiliary sprocket having a diameter different than the diameter of either of said first mentioned sprockets and when mounted on the end of the stud being disposed between the back of the housing and said plane, and means removably securing the auxiliary sprocket on said stud and cover means on said housing to complete the enclosure for said sprockets and said drive chain.

References Cited in the file of this patent

UNITED STATES PATENTS

| | | |
|---|---|---|
| 310,584 | Hamilton | Jan. 13, 1885 |
| 414,419 | Lindsley | Nov. 5, 1889 |
| 627,601 | Seymour | June 27, 1899 |
| 1,167,887 | Clarke | Jan. 11, 1916 |
| 1,544,455 | Hunt | June 30, 1925 |
| 1,851,196 | Lewis | Mar. 29, 1932 |
| 1,858,782 | Masury | May 17, 1932 |
| 2,196,347 | Von Meyenburg | Apr. 9, 1940 |
| 2,249,874 | White | July 22, 1941 |
| 2,328,174 | Silver | Aug. 31, 1943 |
| 2,337,586 | Bowen | Dec. 28, 1943 |
| 2,554,061 | Sandberg | May 22, 1951 |
| 2,650,000 | Walz et al. | Aug. 25, 1953 |
| 2,745,330 | Nelson | May 15, 1956 |
| 2,789,736 | Agnoletto | Apr. 23, 1957 |

FOREIGN PATENTS

| | | |
|---|---|---|
| 139,646 | Australia | Dec. 7, 1950 |
| 11,574 | Great Britain | 1897 |